United States Patent Office 3,636,174
Patented Jan. 18, 1972

3,636,174
PROCESS FOR PREPARING CYCLODODECATRIENE
Katsuyuki Nakamura, Tokyo, Masanori Tanabe, Asaka, Yoshiyuki Mizoguchi, Iruma-gun, and Hirohisa Fukuda, Tokyo, Japan, assignors to Asahi Kasei Kogyo Kabushiki Kaisha, Tokyo, Japan
No Drawing. Filed Aug. 6, 1970, Ser. No. 61,823
Claims priority, application Japan, Aug. 12, 1969, 44/63,275; Sept. 10, 1969, 44/71,204; Sept. 16, 1969, 44/72,994; Dec. 22, 1969, 44/102,567; Mar. 18, 1970, 45/22,262
Int. Cl. C07c 3/00
U.S. Cl. 260—666 B                                     13 Claims

ABSTRACT OF THE DISCLOSURE

Process for preparing cyclododecatriene by cyclizably trimerizing 1,3-butadiene which comprises using a binary catalyst obtained by reacting at a temperature in the range from 5° to 70° C. a mixture of the two catalytic components, (1) a secondary or tertiary alkoxytitanium compound represented by the general formula $$Ti(OCR^IR^{II}R^{III})_nX_{4-n}$$

wherein $n$ is a positive integer from 1 to 4, X is halogen, alkoxy or phenoxy groups, $R^I$ is hydrogen or alkyl group and $R^{II}$ and $R^{III}$ respectively represent alkyl group or $CR^{II}R^{III}$ in combination represents cycloalkyl group and (2) an alkyl aluminum halide represented by the general formula $$AlR^{IV}{}_mX'_{3-m}$$

wherein $m$ is a number from 1 to 2, X' is halogen and $R^{IV}$ represents alkyl or aryl groups.

BACKGROUND OF THE INVENTION

(1) Field of the invention

This invention relates to a process for preparing cyclododecatriene. More particularly, it is concerned with a process for preparing cyclododecatriene by cyclizably trimerizing 1,3-butadiene which comprises using a binary catalyst obtained by reacting a mixture of the two catalytic components, (1) a secondary or tertiary alkoxytitanium compound represented by the general formula $$Ti(OCR^IR^{II}R^{III})_nX_{4-n}$$

wherein $n$ is a positive integer from 1 to 4, X is halogen, alkoxy or phenoxy groups, $R^I$ is hydrogen or alkyl group and $R^{II}$ and $R^{III}$ respectively represent alkyl group or $CR^{II}R^{III}$ in combination represents cycloalkyl group and (2) an alkylaluminum halide represented by the general formula $$AlR^{IV}{}_mX'_{3-m}$$

wherein $m$ is a number from 1 to 2, X' is halogen and $R^{IV}$ represents alkyl or aryl groups, or a ternary catalyst obtained by adding to a mixture of the above-cited alkylaluminum halogenide compound and a sulfoxide represented by the general formula $$R^V{}_2SO$$

wherein $R^V$ represents alkyl or aryl groups, the above-cited secondary or tertiary alkoxytitanium compound.

(2) Description of prior art

It is known that production of cyclododecatriene from butadiene is effected by the use of a catalyst such as a combination of titanium chloride, tetralkoxytitanium or alkoxytitanium halide with an alkylaluminum compound. However, these catalysts are too low in the rate of formation or the selectivity of cyclododecatriene to be commercially utilized. For example, in the use of TiCl$_4$ at a Al/Ti ratio of 3.5–5 there are formed only 3.7 g. of cyclododecatriene per mmol. of the titanium component per hour (cf. Japanese patent publication No. 2372/1960, Example 3). Even with Ti(OR)$_4$ the rate of forming cyclododecatriene is as low as about 8 g./mmol. Ti/hr. and the selectivity is at maximum 80% and usually 70% or below (see, for example, Japanese patent publication No. 7765/1964, Example 8). As for the method by means of an alkoxytitanium halide, German Pat. No. 1,080,547 merely states that it may be used for the synthesis of cyclododecatriene, with no description by means of examples given. Improved processes over these methods include, for example, a method comprising the use of a ternary catalyst composed of titanium chloride, an organic aluminum compound and a compound containing semipolar double bond (cf. Japanese patent publication No. 17974/1962). However, using an improved catalyst in which such a third component is additionally used, the selectivity and the rate of formation of cyclododecatriene-1,5,9 (abbreviated hereinbelow as CDT) are 86.4% and 76 g./mmol. Ti/hr., respectively (Example 3) and at best 93.6% and 90 g./mmol. Ti/hr. (Example 2), which indicate unsatisfactory capacity. In the method comprising the use of a ternary catalyst composed of an alkoxytitanium compound, an organic aluminum compound and a sulfide compound containing no semipolar double bond (German Pat. No. 1,109,674) the selectivity of CDT is as low as 84%. These results indicate that, despite the extensive studies on improved catalysts, prior methods have failed to provide catalysts excellent in both activity and selectivity of CDT.

SUMMARY OF THE INVENTION

As a result of detailed examination of the relationship between the structure of a titanium compound component of the catalyst and catalytical activity or selectivity, we have found that titanium compounds having secondary or tertiary alkoxy group(s) produce results unexpectedly better than those with titanium compounds such as TiCl$_4$ and titanium compounds having primary alkoxy group(s) such as Ti(OC$_2$H$_5$)$_4$ and Ti(OC$_2$H$_5$)$_3$Cl.

Thus, this invention relates to a process for cyclizably trimerizing 1,3-butadiene by the use of a binary catalyst composed of a compound represented by the general formula Ti(OCR$^I$R$^{II}$R$^{III}$)$_n$X$_{4-n}$ wherein $n$ is a positive integer from 1 to 4, X is halogen, alkoxy group or phenoxy group, $R^I$ is hydrogen or alkyl group and $R^{II}$ and $R^{III}$ respectively represent alkyl group or CR$^{II}$R$^{III}$ in combination represents cycloalkyl group and an organic aluminium halogenide or a ternary catalyst obtained by adding to a mixture of the above-cited organic aluminium halogenide and a sulfoxide the above-cited titanium compound. According to the present invention there is produced CDT at a rate of CDT formation of more than 150 g. per mmole of the titanium compound per hour, and under certain conditions, as high as 250 g. or more per mmole of the titanium compound per hour and at more than 90% of selectivity of CDT, and under certain conditions, as high as 95% or higher of selectivity. This invention provides a process which may produce CDT under stable conditions without any variations of the rate of formation and selectivity of CDT caused by the lack of reproducibility which is common with Ziegler type catalysts.

The secondary or tertiary alkoxytitanium compounds of the general formula Ti(OCR$^I$R$^{II}$R$^{III}$)$_n$X$_{4-n}$ wherein $n$, X, R$^I$, R$^{II}$ and R$^{III}$ have the same meaning as above used in this invention are characterized by the structure

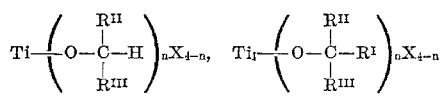

or

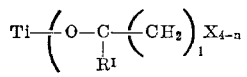

In the structures as set forth above $R^I$ is hydrogen or alkyl group containing from 1 to about 6 carbon atoms, preferably methyl group and $R^{II}$ and $R^{III}$ respectively alkyl group containing from 1 to about 6 carbon atoms, preferably methyl or ethyl groups or $CR^{II}R^{III}$ is cycloalkyl group containing from 5 to about 12 carbon atoms ($l$ being an integer from 4 to about 11), preferably cyclohexyl group. Illustrative of these are titanium tetralkoxides such as, for example, $Ti[OC(CH_3)_3]_4$, $Ti[OCH(C_2H_5)_2]_4$, $Ti[OC(CH_3)_2C_2H_5]_4$ $Ti[OCH(CH_3)_2]_4$, $Ti[OCH(CH_3)(C_3H_7)]_4$ $Ti(O^{cyclo}\text{-}C_5H_9)_4$, $Ti(O^{cyclo}\text{-}C_6H_{11})_4$ $Ti[OCH(CH_3)_2]_2[O\text{---}C_6H_5]_2$ $Ti[OC_2H_5][O^{cyclo}\text{-}C_6H_{11}]_3$ $Ti[OCH_2CH_2CH_3]_2[OCH(CH_3)_2]_2$ and alkoxytitanium halides such as, for example, $Ti[OCH(CH_3)_2]Cl_3$, $Ti[OC(CH_3)_3]_3Cl$ $Ti[OCH(CH_3)_2]_2Br_2$, $Ti[OCH(CH_3)C_2H_5]Cl_3$ $Ti[OCH(C_2H_5)_2]_3Cl$, $Ti[OCH(CH_3)_2]_2Cl_2$ $Ti[OCH(CH_3)C_2H_5]_2Br_2$, $Ti[O^{cyclo}\text{-}C_6H_{11}]_2Cl_2$ $Ti[OC(CH_3)_3]_3Br$, $Ti[OC(CH_3)_2C_2H_5]_3Cl$ $Ti[OC(CH_3)_2C_2H_5]_3Br$, $Ti[OC(CH_3)(C_2H_5)_2]_4$ $Ti[OC(CH_3)(C_2H_5)_2]_3Cl$, $Ti[OC(CH_3)(C_2H_5)_2]_3Br$ and the like. In these formulae, cyclo-$C_5H_9$ and cyclo-$C_6H_{11}$ represent cyclopentyl and cyclohexyl groups.

It is believed that the structural feature of these compounds is closely related with the catalytic activity. As compared with primary alkoxytitanium compounds conventionally used as the catalyst, the titanium compounds of this invention form catalysts having far higher activities by combining the same with organoaluminium compounds. This is an entirely unexpected fact which has been discovered by us. For example, use of a titanium alkoxide derived from primary alcohol $RCH_2OH$ as the catalyst gives catalysts having far lower activities and lower selectivity of CDT than the use of an alkoxide derived from a secondary or tertiary alcohol according to this invention. Under such circumstances, it has been entirely impossible to make use of the titanium alkoxide derived from a primary alcohol commercially. On the contrary, it has been found that titanium alkoxides derived from a secondary and tertiary alcohol, especially from a tertiary alcohol produce catalysts having very high activities and CDT selectivities. The mechanism or reason for such close relationship between the structure of titanium compound and the activity of catalyst is neither quantitatively nor qualitatively elucidated at present. However, it is presumable that the steric effect of an alkoxy group contributes to increase an active site or strongly affects production of an active site with superior reaction selectivity. These titanium compounds are easily synthesized by known methods, for example, those described in Comprehensive Organic Chemistry, vol. 8, p. 401 and Chem. Rev. 1960, p. 1.

The aluminium compounds used in this invention are those represented by the general formula $$AlR^{IV}_m X'_{3-m}$$

wherein $R^{IV}$ represents alkyl or aryl groups, $X'$ represents halogen and $m$ is a number from 1 to 2, which includes, for example, dimethylaluminium chloride, diethylaluminium chloride, di-n-propylaluminium chloride, diethylaluminium bromide, di-iso-butylaluminium bromide, di-n-hexylaluminium chloride, ethylaluminium sesquichloride, isopropylaluminium sesquichloride, phenylaluminium sesquichloride, methylaluminium dichloride, isobutylaluminium dichloride, n-butylaluminium dibromide and the like. Mixtures of these aluminium compounds may be employed. However, especially preferred results are produced by specifying compositions of the alkyl group and halogen atom within the range corresponding to $AlR_{1.8-1.2}X'_{1.2-1.8}$.

The sulfoxides used in the present invention are compounds represented by the general formula $$R^V_2SO$$

wherein $R^V$ represents alkyl group containing 1–6 carbon atoms or aryl group which are illustrated by dimethylsulfoxide, diethylsulfoxide, dipropylsulfoxide, di-n-butylsulfoxide, di-iso-pentylsulfoxide, diphenylsulfoxide and the like.

In carrying out the present invention the catalyst is preferably prepared at a temperature in the range from 5° to 70° C. At lower temperatures the preparation of the catalyst generally requires a long period of time, whereas at higher temperatures the activity of the catalyst tends to be reduced. In preparing the ternary catalyst a titanium compound is added to a mixture of an aluminium compound and a sulfoxide in advance prepared to activate the catalyst.

Proportions of the components mixed are from 0.1 to 10 moles, preferably from 0.1 to 3 moles of the sulfoxide component and from 3 to 200 moles, preferably from 12 to 100 moles of the aluminium component, being common with the binary and ternary catalysts, per mole of the titanium component. In some cases where the proportion of the titanium compound in the reaction system is extremely small the yield in terms of mmol. Ti/hr. will be high even at an Al/Ti ratio over 100. Although the proportion of the sulfoxide to the titanium component greatly affects the activity and selectivity of catalyst, the optimum values thereof depend upon the natures of titanium compound and sulfoxide as well as upon the proportion of the aluminium component. In general, favorable results will be produced by addition of a larger amount of the sulfoxide component in cases where a large amount of the aluminium component is used for the titanium component. In most cases, however, the optimum value for the sulfoxide component will generally be in the range from 0.1 to 3 moles per mole of the titanium component.

The preparation of catalyst and the trimerization reaction of butadiene may be carried out in the absence of any solvent but are preferably in the presence of an inert solvent. Examples of the inert solvent are aromatic compounds such as benzene, toluene, xylene and monochlorobenzene and aliphatic hydrocarbons such as pentane, hexane, cyclohexane and cyclododecatriene.

The reaction temperature for the trimerization of butadiene is from 20° to 150° C., preferably from 30° to 80° C. At lower temperatures, the rate of the reaction will be slow, whereas at higher temperatures, the rate of polymer formation will be increased with the result of reduction of the yield of CDT.

The reaction may be conducted under either reduced or elevated pressure. In general, the pressure from atmospheric to about 10 kg./cm.² is convenient for the operation.

The CDT obtained by the process of this invention is for the most part trans,trans,cis-isomer, with a minimum amount of the trans,trans,trans-isomer formed.

The CDT thus produced can be easily separated by distillation following inactivation of the catalyst in the reaction system.

The CDT obtained by the process of this invention is a valuable starting material for organic syntheses. For example, it can be hydrogenated by conventional means. Thus, from CDT are obtained cyclododecene and cyclododecane, which can be oxidized by conventional means to produce cyclododecanone and dicarboxylic acids. Cyclododecanone is used as the starting material for laurolactam. On the other hand, CDT can be converted directly to succinic acid. As well known, these various compounds are valuable starting materials for the production of synthetic resins, for example, polyamides.

DESCRIPTION OF THE PREFERRED EMBODIMENTS

The invention will be described in greater detail in conjunction with the following specific examples.

EXAMPLE 1

A 2-1. four-necked flask in which a air-tight stirrer is built was equipped with an inlet and outlet for butadiene, thermometer, inlet for the catalyst and reflux condenser and purged with nitrogen. In the flask were placed 200 ml. of chlorobenzene, in which 2 mmol. of tritertiary butoxytitanium chloride were dissolved. To the resulting solution was gradually added ethylaluminium sesquichloride in various ratios while maintaining the temperature at 20° C. After completion of the addition stirring was continued at room temperature for additional 2 hrs. followed by introduction of butadiene. Reaction temperature of butadiene was controlled at 40° C. Introduction of butadiene was discontinued after 2 hours and then methanol was added to inactivate the catalyst. The reaction mixture was subjected ot distillation to remove by-product polymers and the distillate was analyzed by gas chromatography to determine the products. Al/Ti ratios and results of the reaction are shown in Table 1.

TABLE 1

| Run No. | Al/Ti | Composition of product (percent) | | | Rate of CDT formation (g./mmol. Ti/hr.) |
|---|---|---|---|---|---|
| | | Polymer | Dimer and others | CDT | |
| 1 | 8 | 24.1 | 5.0 | 70.9 | 56 |
| 6 | 10 | 15.2 | 3.5 | 81.3 | 115 |
| 3 | 12 | 8.0 | 2.0 | 90.0 | 183 |
| 4 | 14 | 6.8 | 1.8 | 91.4 | 205 |
| 5 | 16 | 7.0 | 1.9 | 91.1 | 190 |
| 6 | 18 | 7.4 | 1.8 | 90.8 | 185 |
| 7 | 20 | 11.1 | 1.6 | 87.3 | 168 |
| 8 | 25 | 12.6 | 1.6 | 85.8 | 147 |
| 9 | 35 | 10.5 | 1.7 | 87.8 | 155 |
| 10 | 100 | 14.3 | 2.3 | 83.2 | 158 |
| 11 | 150 | 15.9 | 3.0 | 81.1 | 145 |
| 12 | 100 | 16.7 | 3.4 | 79.9 | 136 |

EXAMPLE 3

Run 5 of Example 1 was repeated except for the temperature at which the catalyst was prepared. The reaction temperature of butadiene was 40° C. and the reaction time was 2 hours. The results are shown in Table 2.

TABLE 6

| Run No. | Condition for preparing catalyst | | Composition of product (percent) | | | Rate of CDT formation (g./mmol. Ti/hr.) |
|---|---|---|---|---|---|---|
| | Temperature (° C.) | Time (hrs.) | Polymer | Dimer | CDT | |
| 1 | 0 | 4 | 8.5 | 4.2 | 87.3 | 162 |
| 2 | 5 | 4 | 7.2 | 2.4 | 90.4 | 202 |
| 3 | 10 | 4 | 7.1 | 6.1 | 90.8 | 198 |
| 4 | 20 | 4 | 7.1 | 2.3 | 90.6 | 201 |
| 5 | 40 | 4 | 6.9 | 1.9 | 91.2 | 223 |
| 6 | 70 | 3 | 7.6 | 2.4 | 90.0 | 192 |
| 7 | 80 | 3 | 11.7 | 3.8 | 84.5 | 538 |
| 8 | 100 | 3 | 16.5 | 6.3 | 77.2 | 87 |

EXAMPLE 4

Capacities as a component of the catalyst for cyclizably trimerizing butadiene were examined for a variety of tetralkoxytitanium compounds. The reaction vessel and the methods of separating and quantitatively analyzing the products were the same as in Example 1. In the flask were placed 100 ml. of toluene, to which a 1:7 mixture of ethylaluminum dichloride and ethylaluminum sesquichloride was added. The resulting mixture was thoroughly stirred and then 3 mmol. of tetralkoxytitanium in toluene solution were added while maintaining the temperature at a predetermined degree. After completion of the addition of tetralkoxytitanium the catalyst was aged at 60° C. for 1 hr. under a slow stream of butadiene. Then, butadiene was vigorously introduced with external cooling. The reaction temperature was 60° C. and the reaction time was 2 hrs. Results of the experiments are shown in Table 3. Runs 1–7 represent the process of this invention and Runs 8–13 represent comparative experiements. It is apparent that the tetralkoxytitaniums of Runs 8–13, even when used to prepare the catalyst by the method of this invention, give rates of CDT formation as low as 100 g./mmol. Ti/hr.

TABLE 3

| Run No. | Tetralkoxytitanium | Al/Ti | Temperature of catalyst preparation (° C.) | | Composition of product (percent) | | | Rate of CDT formation (g./mmol. Ti/hr.) |
|---|---|---|---|---|---|---|---|---|
| | | | On mixing | On aging | Polymer | Dimer | CDT | |
| 1 | Ti[OC(CH$_3$)$_2$(C$_2$H$_5$)]$_4$ | 18 | 20 | 60 | 7.0 | 2.0 | 91.0 | 233 |
| 2 | Ti[OC(CH$_3$)$_3$]$_4$ | 14 | 40 | 60 | 7.2 | 1.6 | 91.2 | 214 |
| 3 | Ti[OCH(CH$_3$)$_2$]$_4$ | 16 | 60 | 60 | 7.6 | 2.0 | 90.4 | 178 |
| 4 | Ti[OC$^{yclo}$C$_6$H$_{11}$]$_4$ | 18 | 20 | 60 | 7.3 | 1.4 | 91.3 | 188 |
| 5 | Ti[OCH$_2$CH$_2$CH$_3$]$_2$[OCH(CH$_3$)$_2$]$_2$ | 16 | 60 | 60 | 7.9 | 1.9 | 90.2 | 156 |
| 6 | Ti[OC$_6$H$_5$]$_2$[OCH(CH$_3$)$_2$]$_2$ | 16 | 60 | 60 | 8.3 | 1.6 | 90.1 | 152 |
| 7 | Ti[OCH$_2$CH$_3$][OC$^{yclo}$C$_6$H$_{11}$]$_3$ | 16 | 60 | 60 | 7.5 | 1.7 | 90.8 | 155 |
| 8 | Ti[OCH$_2$CH$_2$CH$_2$CH$_3$]$_4$ | 18 | 20 | 60 | 9.7 | 2.1 | 88.2 | 108 |
| 9 | Ti[OCH$_2$CH(CH$_3$)$_2$]$_4$ | 18 | 20 | 60 | 9.5 | 1.9 | 88.6 | 108 |
| 10 | Ti[OCH$_2$CH$_2$CH$_2$CH$_3$]$_4$ | 14 | 40 | 60 | 12.3 | 1.6 | 86.1 | 98 |
| 11 | Ti[OCH$_2$CH$_2$CH$_3$]$_4$ | 16 | 60 | 60 | 10.6 | 2.2 | 87.2 | 90 |
| 12 | Ti[OCH$_2$CH$_3$]$_4$ | 16 | 60 | 60 | 10.0 | 2.4 | 87.6 | 102 |
| 13 | Ti[OC$_6$H$_5$]$_4$ | 16 | 60 | 60 | 11.2 | 1.4 | 87.3 | 87 |

EXAMPLE 2

An experiment was made using the same apparatus and conditions as in Example 1 except that 1 mmol. of tritertiary butoxytitanium chloride and 100 mmol. of ethylaluminium sesquichloride were used. Composition of the product was 8.6% polymer, 1.8% dimer and others and 89.6% CDT and rate of CDT formation was 200 g./mmol. Ti/hr.

EXAMPLE 5

A variety of alkoxytitanium halogenide compounds were examined for catalytic activity. As the second component of the catalyst was used a 7:1 mixture of methylaluminium sesquichloride and dimethylaluminum chloride. As in Example 3, the alkylaluminium compounds were dissolved in 100 ml. of benzene in the flask and the solution was thoroughly stirred, followed by addition of an alkoxytitanium halide. Amount of the titanium component was 3 mmol. After the preparation of catalyst at predetermined temperature butadiene was introduced and the reaction was made for 2 hours. The results are shown in Table 4. Runs 1–6 represent the process according to this invention, which indicates that rate of CDT formation is at least 100 g./mmol. Ti/hr. On the other hand, in comparative experiments under Runs 7–12, though being improved over the comparative experiments in Example 3, both the rate of formation and the ratio of selection are too low to be commercially used for the production of CDT.

EXAMPLE 7

In the same flask as in Example 5 were placed 200 ml. of toluene, to which were added 50 mmol. of ethylaluminium sesquichloride and 3 or 6 mmol. of dimethylsulfoxide. To the resulting mixture were then added 3 mmol. of tetratertiary butoxytitanium to prepare a catalyst. Into the resulting mass was introduced butadiene at 60° C. for 1.5 hrs. (Runs 2 and 3.) For comparison, experiments were made by reacting the Ti component and Al component followed by addition of the sulfoxide (Runs 4 and 5), by mixing the Ti component and sulfoxide followed by reaction with the Al component (Runs 6 and

TABLE 4

| Run No. | Alkoxytitanium halide | Al/Ti | Temperature of catalyst preparation (° C.) | Composition of product (percent) | | | Rate of CDT formation (g./mmol. Ti/hr.) |
|---|---|---|---|---|---|---|---|
| | | | | Polymer | Dimer | DCT | |
| 1 | $Ti[OCH(CH_3)_2]_2Cl_2$ | 14 | 50 | 7.2 | 1.8 | 91.0 | 184 |
| 2 | $Ti[OCH(CH_3)_2]_2Br_2$ | 14 | 50 | 6.2 | 1.7 | 92.1 | 169 |
| 3 | $Ti[OCH(CH_3)_2]_3Cl$ | 14 | 50 | 7.3 | 2.0 | 90.7 | 195 |
| 4 | $Ti[OCH(CH_3)(C_2H_5)]Cl_3$ | 16 | 40 | 7.3 | 2.1 | 90.6 | 204 |
| 5 | $Ti[OC(CH_3)_3]_3Cl$ | 16 | 40 | 6.9 | 1.9 | 91.2 | 223 |
| 6 | $Ti[OC_{cyclo}C_6H_{11}]_2Cl_2$ | 16 | 40 | 6.9 | 1.3 | 91.8 | 202 |
| 7 | $Ti[OCH_2CH_3]_2Cl_2$ | 14 | 50 | 8.5 | 2.2 | 89.3 | 130 |
| 8 | $Ti[OCH_2CH_3]_2Cl_2$ | 14 | 50 | 10.4 | 1.8 | 87.8 | 118 |
| 9 | $Ti[OCH_2CH_2CH_2CH_3]_3Cl$ | 16 | 40 | 9.8 | 1.9 | 33.3 | 107 |
| 10 | $Ti[OCH_2CH(CH_3)C_2H_5]_2Cl_2$ | 16 | 40 | 8.3 | 2.0 | 89.7 | 126 |
| 11 | $Ti[OCH_2CH_2CH(CH_3)_2Cl_2$ | 16 | 40 | 8.0 | 2.1 | 89.9 | 122 |
| 12 | $Ti[OCH_2CH_2CH_2CH_3]Cl_3$ | 16 | 40 | 9.1 | 2.0 | 88.9 | 138 |

EXAMPLE 6

A 3-l, four-necked flask equipped with a cooler, thermometer, gas inlet and air-tight stirrer was well dried and purged with nitrogen. In the flask were placed 250 ml. of toluene, to which were added with stirring 2 mmol. of dimethylsulfoxide and 40 mmol. of ethylaluminium sesquichloride. To the resulting mixture were then added 2 mmol. of triisopropoxymonochlorotitanium. Then, dry butadiene was passed through the reaction vessel at a rate slightly faster than that of absorption of the butadiene. The reaction temperature was 60° C. and the reaction time was 2 hrs. After completion of the reaction the catalyst was inactivated by the addition of a small amount of ethanol and the inactivated catalyst was removed. The distillate from reduced distillation was then analyzed by gas chromatography. Rate of CDT formation on average in 2 hrs. was 242 g./mmol. Ti/hr. and composition of the product was 96.1% CDT, 3.0% polymer and 0.9% dimer and others. The CDT-1, 5, 9 contains 99.1% trans,trans, cis-isomer.

7) and in the absence of the sulfoxide (Run 1). The amount of sulfoxide added was varied in the experiments according to this invention and the comparative experiments to investigate the method of preparing the catalyst. The results are shown in Table 5.

TABLE 5

| | Run No. | Dimethyl-sulfoxide/Ti (molar ratio) | Ratio of CDT formation (g./mmol. Ti/hr.) | Composition of product, percent (selectivity) | | |
|---|---|---|---|---|---|---|
| | | | | CDT | Dimer | Polymer |
| Example 7 | 1 | 0 | 208 | 90.4 | 1.0 | 8.6 |
| | 2 | 1 | 256 | 95.8 | 0.8 | 3.4 |
| | 3 | 2 | 237 | 93.9 | 0.9 | 5.2 |
| Comparative Example | 4 | 1 | 193 | 91.8 | 0.9 | 7.3 |
| | 5 | 2 | 175 | 8.87 | 1.2 | 10.1 |
| | 6 | 1 | 184 | 92.2 | 1.0 | 6.8 |
| | 7 | 2 | (¹) | | | |

¹ Very low activity.

EXAMPLE 8

Experiments were made on a variety of alkoxy halogenated titanium components using the same apparatus and procedures as in Example 5. In 250 ml. of toluene were mixed 40 mmol. of ethylaluminium sesquichloride and 2 mmol. of dimethylsulfoxide, followed by addition of 2 mmol. of a titanium component to prepare the catalyst. Butadiene was then reacted. Experiments were also made in the absence of dimethylsulfoxide. In the latter case were employed 200–300 ml. of toluene as the solvent and 2–3 mmol. of the Ti component (Runs 2, 6 and 10). The results are shown in Table 6, in which t-BuO and iso-PrO represent tertiary butoxy and iso-propoxy groups respectively.

TABLE 6

| Run No. | Titanium component | Al/Ti (molar ratio) | Sulfoxide/Ti (molar ratio) | Rate of CDT formation (g./mmol. Ti/hr.) | Composition of product (percent) | | |
|---|---|---|---|---|---|---|---|
| | | | | | CDT | Dimer | Polymer |
| 1 | Ti(t-BuO)₃Cl | 20 | 1 | 245 | 95.4 | 0.8 | 3.8 |
| 2 | | 15 | 0 | 216 | 91.1 | 1.8 | 7.1 |
| 3 | Ti(iso-PrO)Cl₃ | 20 | 1 | 202 | 93.7 | 0.8 | 5.5 |
| 4 | | 18 | 0 | 158 | 90.8 | 1.3 | 7.9 |
| 5 | Ti(iso-PrO)₂Cl₂ | 20 | 1 | 217 | 93.8 | 0.9 | 5.3 |
| 6 | | 17 | 0 | 176 | 90.8 | 1.8 | 7.4 |
| 7 | Ti(iso-PrO)₃Cl | 20 | 1 | 242 | 96.1 | 0.9 | 3.0 |
| 8 | | 20 | 0 | 191 | 90.1 | 1.0 | 8.9 |
| 9 | Ti(iso-PrO)₂Br₂ | 20 | 1 | 220 | 93.5 | 1.0 | 5.5 |
| 10 | | 15 | 0 | 148 | 91.8 | 1.8 | 6.4 |
| 11 | Ti(iso-PrO)₃Br | 20 | 1 | 231 | 96.9 | 0.9 | 2.2 |
| 12 | | 18 | 0 | 197 | 90.9 | 1.2 | 7.9 |

EXAMPLE 9

Experiments were made on a variety of tetralkoxytitanium compounds as well as on a variety of sulfoxide compounds using the same apparatus and procedures as in Example 5. As the solvent were used 100 or 200 ml. of toluene and 3 mmol. of the titanium component was employed. The reaction temperature was 60° C. except for Run 7 in which reaction was made at 50° C. in chlorobenzene solvent. In Run 8, 2 mmol. of the titanium component was used. The results are shown in Table 7. In every case addition of a sulfoxide improves the selectivity and activity. As compared with comparative experiments as set forth below (Table 8), advantages of the process according to the present invention will be apparent.

EXAMPLE 10

In reactions similar to those in Example 1 there were varied proportions of the aluminium and sulfoxide components for the titanium component to investigate the optimum conditions. The results are shown in Table 10. Both activity and selectivity are excellent with dimethylsulfoxide/Ti molar ratios from 1 to 1.5 in the case where the Al/Ti is 20, the activity being a little lower with a dimethylsulfoxide/Ti molar ratio of 3. On the other hand, in the case where the Al/Ti molar ratio is 100, similar results are produced with dimethylsulfoxide/Ti molar ratios from 1 to 4. In every case, the activity and selectivity are superior to the case where no sulfoxide is added (Run 8).

TABLE 10

| | Run No. | Demethylsulfoxide/Triisopropoxytitanium chloride (molar ratio) | $AlEt_{1.5}Cl_{1.5}$/Triisopropoxytitanium chloride (molar ratio) | Rate of CDT formation (g./mmol. Ti/hr.) | CDT selectivity (percent) |
|---|---|---|---|---|---|
| Example 10 | 1 | 0.1 | 20 | 220 | 92.6 |
| | 2 | 1 | 20 | 242 | 96.1 |
| | 3 | 1.5 | 20 | 248 | 95.5 |
| | 4 | 3 | 20 | 208 | 95.2 |
| | 5 | 4 | 100 | 230 | 94.0 |
| | 6 | 1 | 15 | 234 | 93.4 |
| | 7 | 1 | 100 | 238 | 94.7 |
| | 8 | 0 | 20 | 191 | 90.1 |

Comparative examples are shown in Tables 8 and 9 in which tetra-primary alkoxytitaniums, alkoxytitanium halogenides and titanium tetrachloride, being beyond the scope of this invention, were employed. Although the effects of the addition of sulfoxide are apparent, the results are inferior to those according to this invention as shown in Table 7.

What is claimed is:

1. Process for preparing cyclododecatriene by cyclizably trimerizing 1,3-butadiene which comprises using a binary catalyst obtained by reacting at a temperature in the range from 5° to 70° C. a mixture of the two catalytic components, (1) a secondary or tertiary alkoxytitanium compound represented by the general formula

TABLE 7

| Run No. | Titanium component | Al component (mmol.) $AlEt_{1.5}Cl_{1.5}$ | $AlEtCl_2$ | Al/Ti (molar ratio) | Sulfoxide | Sulfoxide/Ti (molar ratio) | Rate of CDT formation (g./mmol. Ti/hr.) | CDT selectivity (percent) |
|---|---|---|---|---|---|---|---|---|
| 1 | $Ti(O-\underset{CH_3}{\underset{|}{C}}-C_2H_5)_4$ | 47.2 | 6.8 | 18 | Diethylsulfoxide | ⅔ | 257 | 96.3 |
| 2 | (same) | 47.2 | 6.8 | 18 | | 0 | 233 | 91.0 |
| 3 | $Ti(O-\underset{CH_3}{\underset{|}{C}}-C_2H_5)_4$ | 80 | 4 | 28 | Dimethylsulfoxide | 2 | 227 | 95.8 |
| 4 | (same) | 80 | 4 | 28 | | 0 | 166 | 90.2 |
| 5 | $Ti(O-C_6H_{11})_4$ | 45 | 0 | 15 | Dimethylsulfoxide | 1 | 230 | 93.7 |
| 6 | (same) | 45 | 0 | 15 | | 0 | 185 | 91.0 |
| 7 | $Ti(iso-PrO)_4$ | 51 | 0 | 17 | Diphenylsulfoxide | ⅓ | 218 | 92.1 |
| 8 | $Ti(iso-PrO)_4$ | 40 | 0 | 20 | Dimethylsulfoxide | 1 | 225 | 93.1 |
| 9 | $Ti(iso-PrO)_4$ | 45 | 0 | 15 | | 0 | 167 | 90.4 |
| 10 | $Ti(t-BuO)_4$ | 81 | 0 | 27 | Dimethylsulfoxide | 1 | 256 | 95.8 |
| 11 | $Ti(t-BuO)_4$ | 81 | 0 | 27 | | 0 | 208 | 90.4 |
| 12 | $Ti(iso-PrO)_2-(n-PrO)_2$ | 48 | 0 | 16 | Dimethylsulfoxide | 1 | 201 | 92.8 |
| 13 | $Ti(iso-PrO)_2-(n-PrO)_2$ | 48 | 0 | 16 | | 0 | 150 | 90.0 |

TABLE 8

| Run No. | Titanium component | Al component (mol.) $AlEt_{1.5}Cl_{1.5}$ | $AlEtCl_2$ | Al/Ti (molar ratio) | Sulfoxide | Sulfoxide/Ti (molar ratio) | Rate of CDT formation (g./mmol. Ti/hr.) | CDT selectivity (percent) |
|---|---|---|---|---|---|---|---|---|
| 1 | $Ti(EtO)_4$ | 48 | 0 | 16 | Dimethylsulfoxide | 2 | 154 | 91.6 |
| 2 | $Ti(PrO)_4$ | 42 | 6 | 16 | do | 2 | 126 | 91.2 |

TABLE 9

| Run No. | Titanium component | Al/Ti (molar ratio) | Sulfoxide/Ti (molar ratio) | Rate of CDT formation (g./mmol. Ti/hr.) | Composition of product (percent) CDT | Dimer | Polymer |
|---|---|---|---|---|---|---|---|
| 1 | $Ti(BuO)_3Cl$ | 20 | 1 | 145 | 92.6 | 1.1 | 6.3 |
| 2 | $Ti(BuO)Cl_3$ | 20 | 1 | 175 | 91.9 | 1.0 | 7.1 |
| 3 | $Ti(ProO)_2Cl_2$ | 20 | 1 | 161 | 92.8 | 0.8 | 6.4 |
| 4 | $Ti(EtO)_2Cl_2$ | 20 | 1 | 163 | 92.0 | 1.0 | 7.0 |
| 5 | $TiCl_4$ | 20 | 1 | 115 | 89.9 | 1.5 | 8.6 |

NOTE.—Bu represents n-butyl group and Pr represents n-propyl group.

Ti(OCR¹R¹¹R¹¹¹)ₙX₄₋ₙ wherein $n$ is a positive integer from 1 to 4, X is halogen, alkoxy or phenoxy groups, R¹ is hydrogen or alkyl groups and R¹¹ and R¹¹¹ respectively represent alkyl groups or CR¹¹R¹¹¹ in combination represents cycloalkyl groups and (2) an alkyl-aluminum halide compound represented by the general formula AlR^IV_mX'_{3-m} wherein $m$ is a number from 1 to 2, X' is halogen and R^IV represents alkyl or aryl groups.

2. Process according to claim 1 wherein the alkoxytitanium compound is selected from the group consisting of Ti[OCH(C₂H₅)₂]₄, Ti[OCH₂CH₂CH₃]₂[OCH(CH₃)₂]₂

Ti[OCH(CH₃)₂]₄, Ti[OCH(CH₃)H₇)]₄, $$\text{Ti}\left[\text{OCH(CH}_3\text{)}\left(\text{CH}\begin{matrix}\text{CH}_3\\ \text{CH}_3\end{matrix}\right)\right]_4$$

Ti[O^{Cyclo}-C₅H₉]₄, Ti[O^{Cyclo}-C₆H₁₁]₄,

Ti[OCH(CH₃)]₂[O-C₆H₅]₂, Ti[OC₂H₅][O^{Cyclo}-C₆H₁₁]₃
Ti[OCH₂CH₂CH₃]₂[OCH₃)₂]₂, Ti[OCH(CH₃)₂]Cl₃
Ti[OCH(CH₃)₂]₂Br₂, Ti[OCH(CH₃)C₂H₅]Cl₃
Ti[OCH(CH₃)₂]₃Cl, Ti[OCH(C₂H₅)₂]₃Cl
Ti[OCH(CH₃)₂]₂Cl₂, Ti[OCH(CH₃)₂H₅]₂Br₂ and Ti[O^{Cyclo}-C₆H₁₁]₂Cl₂.

3. Process according to claim 1 wherein the alkoxytitanium compound is selected from the group consisting of Ti[OC(CH₃)₃]₄, Ti[OC(CH₃)₂C₂H₅]₄
Ti[OC(CH₃)₃]₃Cl, Ti[OC(CH₃)₃]₃Br
Ti[OC(CH₃)₂C₂H₅]₃Cl, Ti[OC(CH₃)₂C₂H₅]₃Br
Ti[OC(CH₃)(C₂H₅)₂]₄, Ti[OC(CH₃)(C₂H₅)₂]₃Cl and Ti[OC(CH₃)(C₂H₅)₂]₃Br.

4. Process according to claim 1 wherein the aluminium compound is selected from the group consisting of dimethylaluminium chloride, diethylaluminium chloride, di-n-propylaluminium chloride, diethylaluminium bromide, di-iso-butylaluminium bromide, di-n-hexylaluminium chloride, ethylaluminium sesquichloride, isopropylaluminium sesquichloride, phenylaluminium sesquichloride, methylaluminium dichloride, isobutylaluminium dichloride and n-butylaluminium dibromide.

5. Process according to claim 1 wherein the aluminium compound is represented by the general formula AlR^IV_{1.8-1.2}X'_{1.2-1.8}

6. Process according to claim 1 wherein from 3 to 200 moles of the aluminium compound are used per mole of the titanium compound.

7. Process according to claim 1 wherein the trimerization reaction is carried out at a temperature from 20° to 150° C.

8. Process for preparing cyclododecatriene by cyclizably trimerizing 1,3-butadiene which comprises using a ternary catalyst obtained by reacting at a temperature in the range from 5° to 70° C. (1) a secondary or tertiary alkoxytitanium compound represented by the general formula Ti(OCR¹R¹¹R¹¹¹)ₙX₄₋ₙ wherein $n$ is a positive integer from 1 to 4, X is halogen, alkoxy or phenoxy groups, R¹ is hydrogen or alkyl groups and R¹¹ and R¹¹¹ respectively represent alkyl groups or CR¹¹R¹¹¹ in combination represents cycloalkyl group, (2) an alkylaluminium halide compound represented by the general formula AlR^IV_mX'_{3-m} wherein $m$ is a number from 1 to 2, X' is halogen and R^IV represents alkyl or aryl groups and (3) a sulfoxide represented by the general formula

R₂^V SO wherein R^V represents alkyl or aryl group, said titanium compound being added to a mixture of said aluminium compound and said sulfoxide in advance prepared to activate the ternary catalyst.

9. Process according to claim 8 wherein the alkoxytitanium compound is selected from the group consisting of Ti[OCH(C₂H₅)₂]₄, Ti[OCH₂CH₂CH₃]₂[OCH(CH₃)₂]₂

Ti[OCH(CH₃)₂]₄, Ti[OCH(CH₃)(C₃H₇)]₄

$$\text{Ti}\left[\text{OCH(CH}_3\text{)}\left(\text{CH}\begin{matrix}\text{CH}_3\\ \text{CH}_3\end{matrix}\right)\right]_4$$

Ti[O^{Cyclo}-C₅H₉]₄, Ti[O^{Cyclo}-C₆H₁₁]₄
Ti[OCH(CH₃)₂]₂[O-C₆H₅]₂, Ti[OC₂H₅][O^{Cyclo}-C₆H₁₁]₃
Ti[OCH₂CH₂CH₃]₂[OCH(CH₃)₂]₂, Ti[OCH(CH₃)₂]Cl₃
Ti[OCH(CH₃)₂]₂Br₂, Ti[OCH(CH₃)C₂H₅]Cl₃
Ti[OCH(CH₃)₂]₃Cl, Ti[OCH(C₂H₅)₂]₃Cl
Ti[OCH(CH₃)₂]₂Cl₂, Ti[OCH(CH₃)₂H₅]₂Br₂ and

Ti[O^{Cyclo}-C₆H₁₁]₂Cl₂

10. Process according to claim 8 wherein the alkoxytitanium compound is selected from the group consisting of Ti[OCH(CH₃)₃]₄, Ti[OCH(CH₃)₂H₅]₄
Ti[OC(CH₃)₃]₃Cl, Ti[OC(CH₃)₃]₃Br
Ti[OC(CH₃)₂H₅]₃Cl, Ti[OC(CH₃)₂C₂H₅]₃Br
Ti[OC(CH₃)(C₂H₅)₂]₄, Ti[OC(CH₃)(C₂H₅)₂]₃Cl and Ti[OC(CH₃)(C₂H₅)₂]₃Br 11. Process according to claim 8 wherein the aluminium compound is selected from the group consisting of dimethylaluminium chloride, diethylaluminium chloride, di-n-propylaluminium chloride, diethylaluminium bromide, di-iso-butylaluminium bromide, di-n-hexylaluminium chloride, ethylaluminium sesquichloride, isopropylaluminium sesquichloride, phenylaluminium sesquichloride, methylaluminium dichloride, isobutylaluminium dichloride and n-butylaluminium dibromide.

12. Process according to claim 8 wherein the sulfoxide is selected from the group consisting of dimethylsulfoxide, diethylsulfoxide, dipropylsulfoxide, di-n-butylsulfoxide, di-iso-pentylsulfoxide and diphenylsulfoxide.

13. Process according to claim 8 wherein from 3 to 200 moles of the aluminium compound and from 0.1 to 10 moles of the sulfoxide are used per mole of the titanium compound.

References Cited
UNITED STATES PATENTS

| | | | |
|---|---|---|---|
| 3,076,045 | 1/1963 | Schneider et al. | 260—666 B |
| 3,149,173 | 9/1964 | Wittenberg et al. | 260—666 B |
| 3,149,174 | 9/1964 | Mueller | 260—666 B |
| 3,280,205 | 10/1966 | Yosidg et al. | 260—666 B |

VERONICA O'KEEFE, Assistant Examiner